US010667496B2

(12) United States Patent
Roisen et al.

(10) Patent No.: US 10,667,496 B2
(45) Date of Patent: Jun. 2, 2020

(54) BOVINE RUMINATION AND ESTRUS PREDICTION SYSTEM (BRES) AND METHOD (71) Applicant: Horse Sense Shoes, LLC, Waysata, MN (US)

(72) Inventors: Roger Roisen, Minnetrista, MN (US); Michael McHugh, Plymouth, MN (US); Craig S. Wilson, Arden Hills, MN (US)

(73) Assignee: Horse Sense Shoes, LLC, Waysata, MN (US)

( * ) Notice: Subject to any disclaimer, the term of this patent is extended or adjusted under 35 U.S.C. 154(b) by 0 days.

(21) Appl. No.: 16/102,600

(22) Filed: Aug. 13, 2018

(65) Prior Publication Data
US 2019/0174722 A1 Jun. 13, 2019

Related U.S. Application Data (63) Continuation of application No. 14/965,372, filed on Dec. 10, 2015, now Pat. No. 10,076,102, which is a
(Continued)

(51) Int. Cl.
A01K 29/00 (2006.01)
A61D 17/00 (2006.01)
(Continued)

(52) U.S. Cl.
CPC .......... *A01K 29/005* (2013.01); *A01K 11/006* (2013.01); *A61D 17/002* (2013.01);
(Continued)

(58) Field of Classification Search
CPC .................................................. A01K 29/005
See application file for complete search history.

(56) References Cited

U.S. PATENT DOCUMENTS 7,335,168 B2 2/2008 Rugg
7,966,971 B2 * 6/2011 Zimmerman ............ A01K 5/02
119/174
(Continued)

FOREIGN PATENT DOCUMENTS

WO WO-2012129657 A1 10/2012
WO WO-2014201039 A2 12/2014
WO WO-2014201039 A3 12/2014

OTHER PUBLICATIONS

"U.S. Appl. No. 14/965,372, Examiner Interview Summary dated Mar. 1, 2018", 3 pgs.
(Continued)

Primary Examiner — Manuel A Rivera Vargas
(74) Attorney, Agent, or Firm — Schwegman Lundberg & Woessner, P.A.

(57) ABSTRACT

A bovine monitoring system may include a rumination sensor, a motion sensor, a posture sensor. The rumination sensor may detect chewing by sensing jaw motion. The motion sensor may detect motion. The posture sensor may detect orientation of the bovine asset through detection of gravitational acceleration, detection of gyroscopic rotation, or a combination of gravitational acceleration and gyroscopic rotation. Using the recorded rumination, motion, and posture sensors, the bovine asset monitoring system may identify aberrations in the estrous cycle or physical or mental health of the bovine assets. A bovine monitoring system may include a thermal scanning device to detect localized heating of the vulva area of the bovine asset, which may be used to identify aberrations in the estrous cycle or physical or mental health of the bovine assets.

17 Claims, 5 Drawing Sheets

Related U.S. Application Data continuation of application No. PCT/US2014/041772, filed on Jun. 10, 2014.

(60) Provisional application No. 61/833,827, filed on Jun. 11, 2013.

(51) Int. Cl.

| | | |
|---|---|---|
| *H04W 4/80* | (2018.01) | |
| *A01K 11/00* | (2006.01) | |
| *G01J 5/00* | (2006.01) | |
| *G06K 19/07* | (2006.01) | |
| *H04N 5/33* | (2006.01) | |
| *H04W 4/02* | (2018.01) | |
| *H04W 4/70* | (2018.01) | |
| *G01P 15/00* | (2006.01) | |

(52) U.S. Cl.
CPC ........ *G01J 5/0025* (2013.01); *G06K 19/0723* (2013.01); *H04N 5/33* (2013.01); *H04W 4/026* (2013.01); *H04W 4/80* (2018.02); *G01J 2005/0077* (2013.01); *G01P 15/00* (2013.01); *H04W 4/70* (2018.02)

(56) References Cited

U.S. PATENT DOCUMENTS

| | | | |
|---|---|---|---|
| 2003/0205208 A1* | 11/2003 | Bar-Shalom | A01K 29/005 119/859 |
| 2006/0125644 A1* | 6/2006 | Sharp | G01C 21/12 340/573.1 |
| 2017/0231198 A1 | 8/2017 | Roisen et al. | |

OTHER PUBLICATIONS

"U.S. Appl. No. 14/965,372, Non Final Office Action dated Jan. 8, 2018", 7 pgs.

"U.S. Appl. No. 14/965,372, Notice of Allowance dated Jul. 13, 2018", 10 pgs.

"U.S. Appl. No. 14/965,372, Response filed Feb. 28, 2018 to Non Final Office Action dated Jan. 8, 2018", 4 pgs.

"International Application Serial No. PCT/US2014/041772, International Preliminary Report on Patentability dated Dec. 23, 2015", 7 pgs.

"International Application Serial No. PCT/US2014/041772, International Search Report dated Apr. 2, 2015", 2 pgs.

"International Application Serial No. PCT/US2014/041772, Written Opinion dated Apr. 2, 2015", 5 pgs.

\* cited by examiner

BOVINE RUMINATION AND ESTRUS PREDICTION SYSTEM (BRES) AND METHOD

RELATED APPLICATION

This application is a continuation of U.S. patent application Ser. No. 14/965,372, filed Dec. 10, 2015, which is a continuation under 35 U.S.C. 111(a) from International Application No. PCTUS2014/041772, filed Jun. 10, 2014, which claims priority to U.S. Provisional Application Ser. No. 61/833,827 (entitled BOVINE RUMINATION AND ESTRUS PREDICTION SYSTEM (BRES) AND METHOD, filed Jun. 11, 2013) which are incorporated herein by reference.

BACKGROUND

Existing Bovine Rumination and Estrus Prediction Systems (BRESs) collect data only 1-3 times per day when the bovine enters a parlor. These BRESs then analyze the data in an attempt to predict health issues by postural behavior. BRESs may track specific bovine assets, but in existing BRESs, a bovine asset with a specific ID may disassociate the ID with that asset when the bovine walks into a milk station meant for different bovine asset.

SUMMARY

A Bovine Rumination and Estrus Prediction System (BRES) may collect real-time bovine data, and using a low power RE radio, may transmit the collected data to a receiver that acts as a data portal to a server. The collected data may include rumination data, motion data, or posture data. The server may have an algorithm that stores the data, analyzes the data, and displays the data on a histogram.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of firmware and human implemented procedures in one embodiment. The firmware may consist of computer executable instructions stored in flash or FRAM memory. Further, such functions correspond to modules, which are software, hardware, firmware or any combination thereof. Multiple functions may be performed in one or more modules as desired, and the embodiments described are merely examples.

A Bovine Rumination and Estrus Prediction System (BRES) may collect real-time bovine data, and using a low power RF radio, may transmit the collected data to a receiver that acts as a data portal to a server. The collected data may include rumination data, motion data, or posture data. The server may have an algorithm that stores the data, analyzes the data, and displays the data on a histogram.

The algorithm may "exclusive OR" the current data with the previous day's data, where the day-to-day differences may be used to alert the caretaker of a postural or behavioral change. These changes may be indicative of numerous ailments or estrus. The BRES may also employ a device at the entrance to the parlor that takes a thermal scan of the vulva area of the bovine and transmits this data to the server.

The server may have an algorithm that performs an "exclusive OR" from the previous milking event where the day-to-day differences may be used to alert the caretaker of numerous ailments or estrus. In addition, the BRES may record and analyze historical rumination data, where collection and pattern matching algorithms may be employed to detect behavior changes.

Figure 1:
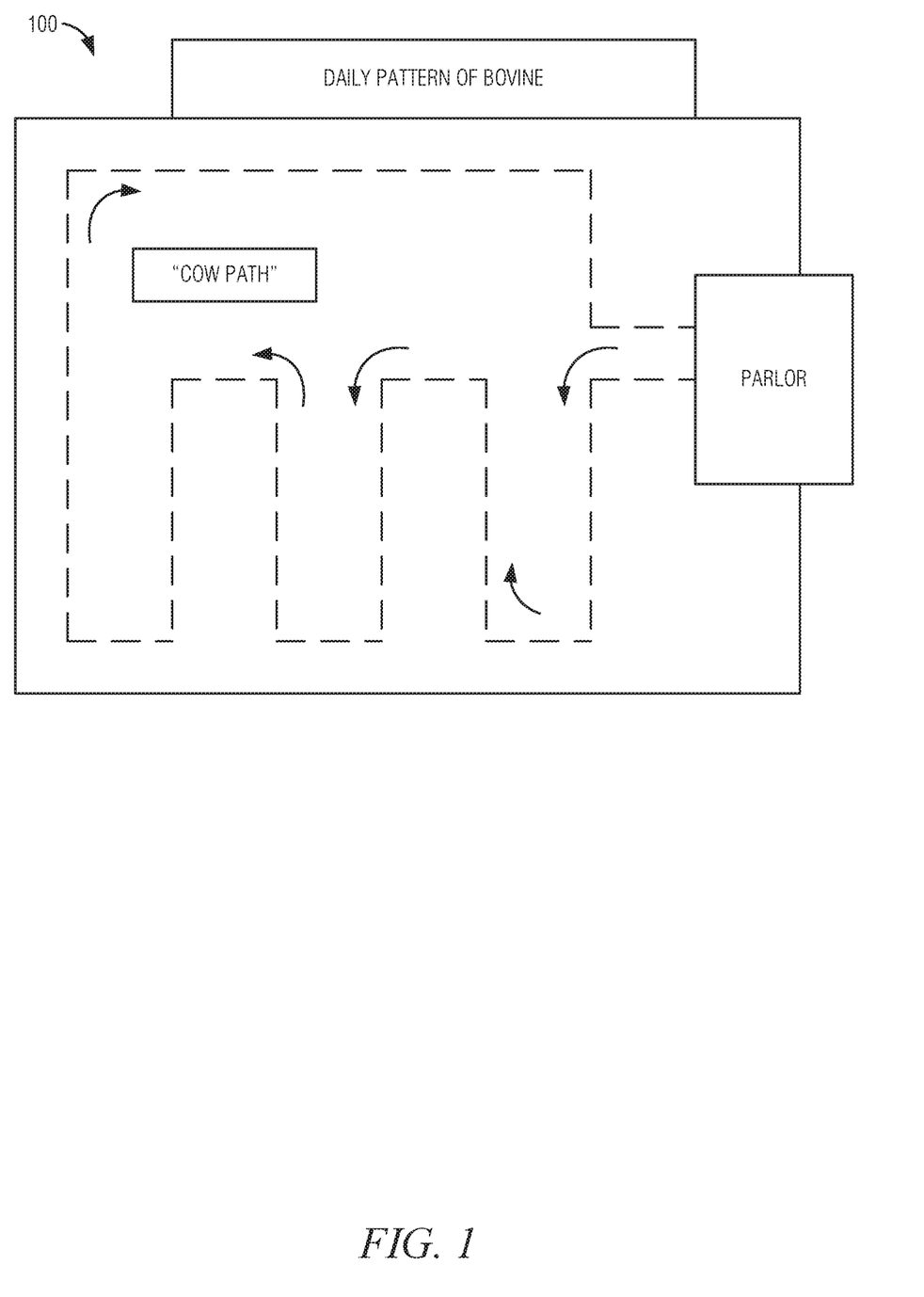
FIG. 1 is a diagram of a daily pattern of an outdoor bovine path according to an example embodiment.

FIG. 1 is a diagram of a daily pattern of an outdoor bovine path 100, according to an example embodiment. The path starts and ends at a parlor and may meander around an enclosed or open outdoor area. The path shown is just one example, and may very significantly in different terrains and for different bovine assets.

Figure 2:
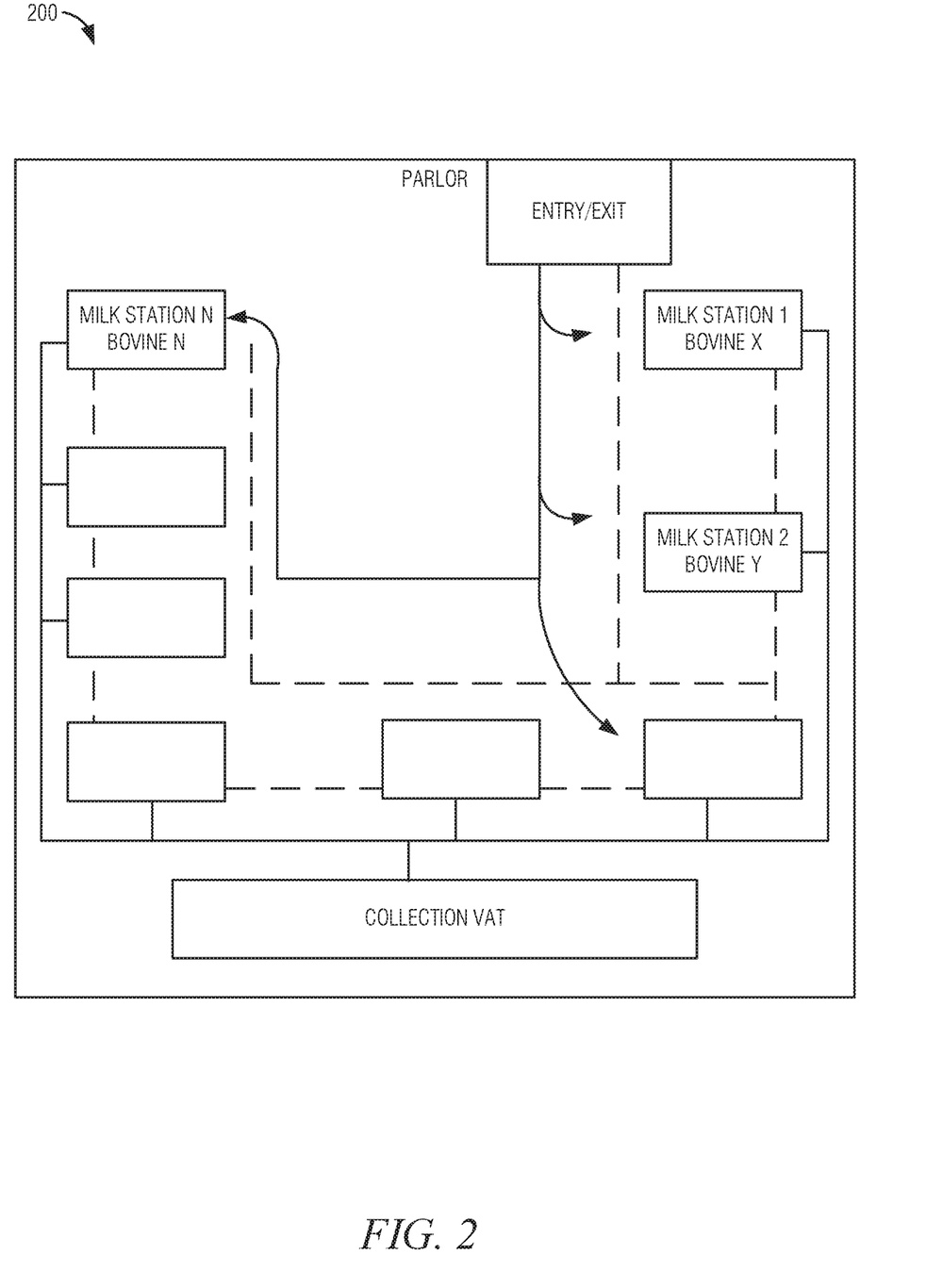
FIG. 2 is a diagram of a daily pattern of an indoor bovine path according to an example embodiment.

FIG. 2 is a diagram of a daily pattern of an indoor bovine path 200, according to an example embodiment. Multiple milk stations are shown in the parlor.

Figure 3:
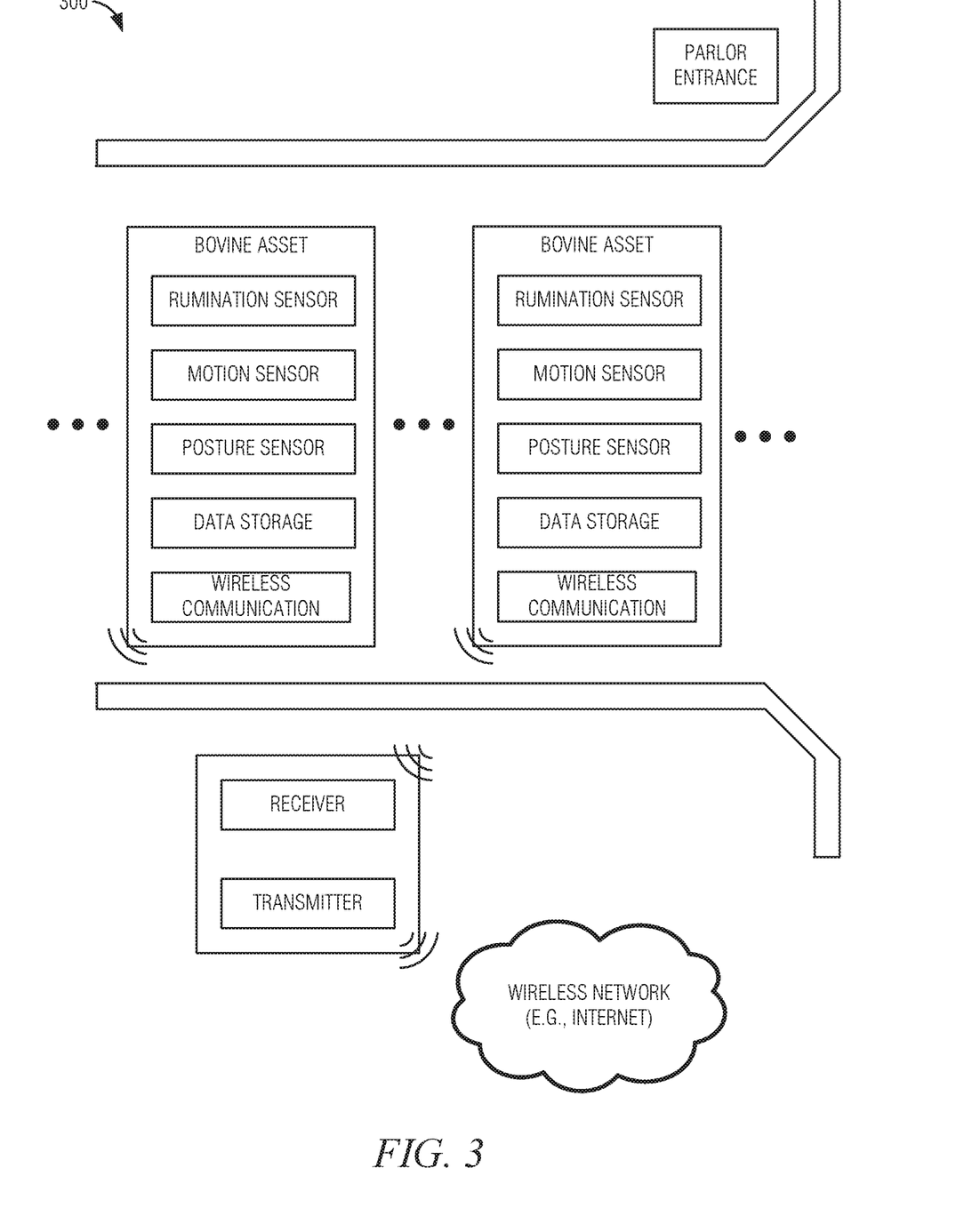
FIG. 3 is a block diagram of a sensor-based BRES according to an example embodiment.

FIG. 3 is a block diagram of a sensor-based bovine asset management sensor system 300, according to an example embodiment. A BRES that utilizes real time data collection every minute as data is transmitted via a low power RF radio to a receiver that acts as the data portal to the server. The server has an algorithm that collects the data on a histogram and "exclusive OR's" the previous days data to alarm the caretaker of a postural or behavioral change. These changes are indicative of numerous ailments or estrus. The system also employs a device at the entrance to the parlor that takes a thermal scan of the vulva area of the bovine and then transmits this data to the server wherein the server algorithm does an "exclusive OR" from the previous milking event. Localized heating will then be an alarm situation. Historical rumination data collection and pattern matching algorithms are employed to detect behavior changes.

A monitoring system for use in monitoring bovine assets may include a rumination sensor, a motion sensor, and a posture sensor. In one embodiment, the rumination sensor may be an accelerometer, which may detect chewing by sensing jaw motion, where a bovine asset typically ruminates for 450 to 500 minutes per day. The motion sensor may be an accelerometer, which may detect motion. The posture sensor may be a gyroscope, accelerometer, or combination gyroscope and accelerometer. The posture sensor may detect orientation of the bovine asset through detection of gravitational acceleration, detection of gyroscopic rotation, or a combination of gravitational acceleration and gyroscopic rotation. Using the recorded rumination, motion, and posture sensors, the bovine asset monitoring system may identify aberrations in the estrous cycle or physical or mental health of the bovine assets. A bovine asset monitoring system may also include a data storage module to record data from various sensors, and may include a wireless communication module to communicate stored data to a network (e.g., the Internet, the "cloud"). In some embodiments the wireless connectivity will be WiFi 802.11, Zigbee 802.15.4 or BTLE 4.0.

Figure 4:
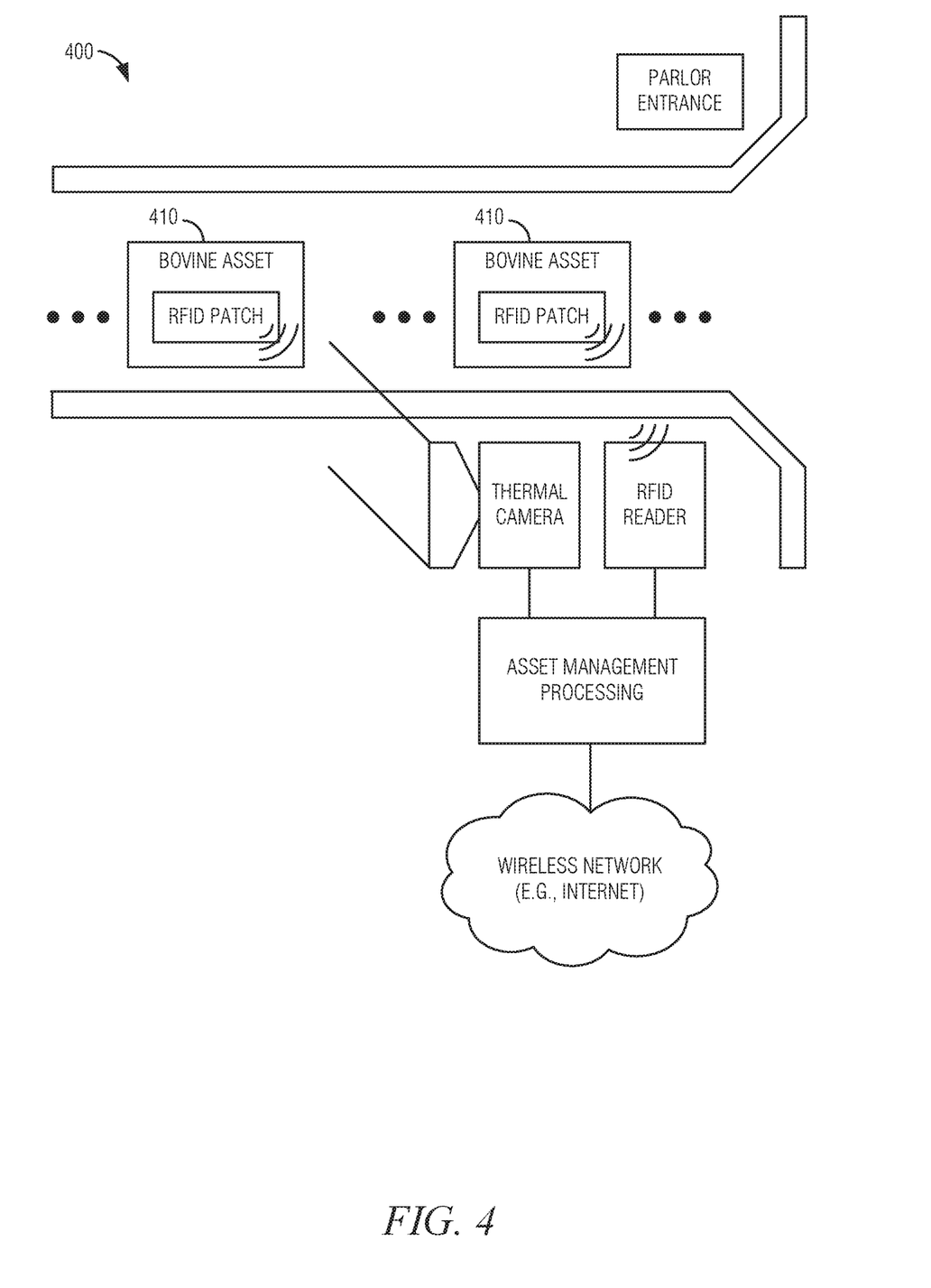
FIG. 4 is a block diagram of a thermal-based BRES according to an example embodiment.

FIG. 4 is a block diagram of a thermal-based bovine asset management system 400, according to an example embodiment. In some embodiments, a bovine monitoring system may include a thermal image camera and an RFID patch. In one embodiment, the bovine assets may be directed through passage (e.g. gate), such as at the beginning or end of the day. As the assets pass through the passage, each asset is identified uniquely through the REID patch, and a thermal image of rear view of a bovine asset is recorded. Using various image processing techniques, thermal variations in each bovine asset's vulva may be used to identify, track, and predict the estrous cycle of the bovine asset.

In various embodiments, the REID patch may be placed in various positions on the bovine asset where data may be sensed. For posture sensing, placing the patch anywhere on the body may be suitable so long as it can detect orientation and acceleration related to posture changes. For rumination, the patch may be placed anywhere on the bovine asset where muscles or motion associated with rumination may be sensed, such as on a neck. In some embodiments, the patch may be hanging or attached to a collar or necklace. The RFID patch may be configured to collect posture or rumination data and transmit the data to a passive or active RFID reader.

Figure 5:
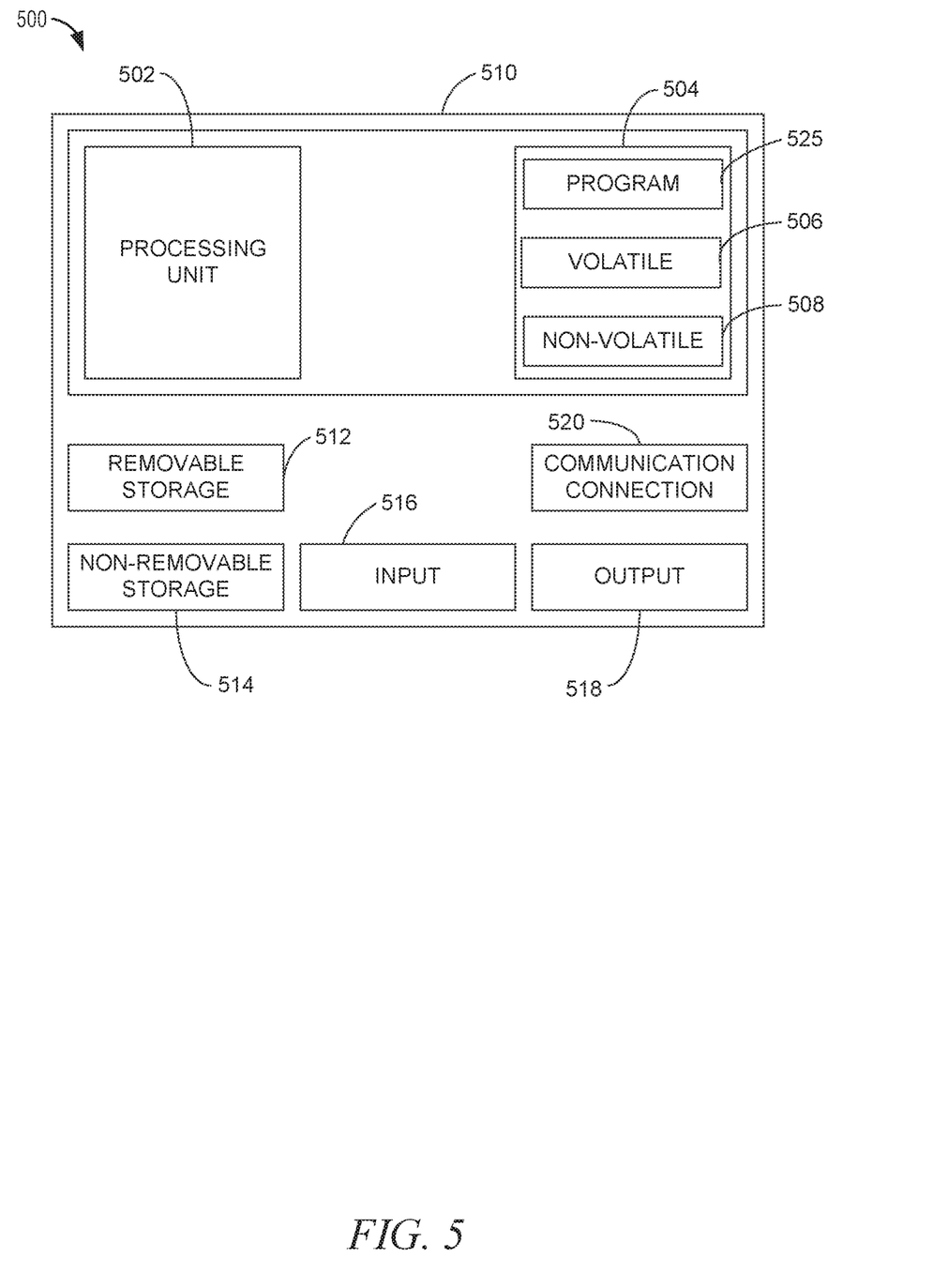
FIG. 5 is block schematic diagram of a computer system for implementing one or more methods and processors according to an example embodiment.

FIG. 5 is a block diagram of a computing device 500, according to an example embodiment. The processors described in some of the above embodiments may include more or fewer components than those shown at 500. Example processors include and 8051 microprocessor or other similar processor. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 500, may include a processing unit 502, memory 504, removable storage 510, and non-removable storage 512. Memory may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), Ethernet, WiFi, BTLE4.0, 802.15.4, or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 500 to provide generic access controls in a COM based computer network system having multiple users and servers.

The following statements are provided as examples, of various embodiments.

1. A bovine asset management system comprising: a rumination sensor to detect a daily bovine asset rumination duration; a motion sensor to detect a daily bovine asset motion; a rumination aberration detection module to detect when the daily bovine asset rumination duration diverges from a known bovine rumination pattern; and a motion aberration detection module to detect when the daily bovine asset motion diverges from a known bovine motion pattern.

2. The system of example 1, wherein the rumination sensor is an accelerometer configured to detect jaw motion.

3. The system of any of examples 1-2, wherein the motion sensor is an accelerometer, and wherein the motion aberration detection module is configured to use dead reckoning to determine a daily motion pattern.

4. The system of any of examples 1-3, wherein the rumination aberration detection module is configured to identify when the daily bovine asset rumination duration falls below a minimum rumination value or exceeds a maximum rumination value.

5. The system of example 4, wherein minimum rumination value is 450 minutes per day, and wherein the maximum rumination value is 500 minutes per day.

6. The system of any of examples 1-5, further comprising: a posture sensor to detect a daily bovine posture; and a posture aberration detection module to detect when the daily bovine posture diverges from a known bovine posture pattern.

7. The system of example 6, wherein the posture sensor is a accelerometer configured to detect bovine posture by detecting gravitational acceleration.

8. The system of any of examples 6-7, wherein the posture sensor is a gyroscope configured to detect changes in bovine posture by detecting gyroscopic rotation.

9. The system of any of examples 1-8, further comprising: a data storage module to record data; and a wireless communication module to communicate stored data to a network.

10. A bovine asset management system comprising: an RFID patch; a thermal imaging sensor to capture thermal images of a bovine vulva; a bovine thermal aberration detection module to detect when the daily bovine thermal aberration diverges from a known bovine thermal pattern.

11. The bovine asset management system of example 10 wherein the RFID patch comprises:
 a rumination sensor to detect a daily bovine asset rumination duration;

a motion sensor to detect a daily bovine asset motion and posture; and a transceiver coupled to receive information from the rumination sensor and the motion sensor.

12. The bovine asset management system of example 11, wherein the rumination sensor comprises an accelerometer to detect chewing by sensing jaw motion.

13. The bovine asset management system of example 12 wherein the motion sensor comprises an accelerometer positioned to detect orientation of the bovine asset.

14. The bovine asset management system of example 13 wherein the motion sensor further comprises a gyroscope positioned to detect rotation of the bovine asset.

15. A bovine asset management device comprising:
a rumination sensor to detect a daily bovine asset rumination duration;
a motion sensor to detect a daily bovine asset motion and posture;
a transceiver coupled to receive information from the rumination sensor and the motion sensor; and
a patch to support the rumination sensor, motion sensor, and transceiver on the bovine asset.

16. The bovine asset management device of example 15, wherein the rumination sensor comprises an accelerometer to detect chewing by sensing jaw motion.

17. The bovine asset management device of example 16 wherein the motion sensor comprises an accelerometer positioned to detect orientation of the bovine asset.

18. The bovine asset management device of example 17 wherein the motion sensor further comprises a gyroscope positioned to detect rotation of the bovine asset.

19. The bovine asset management device of any of examples 15-18 wherein the patch comprises an RFID.

20. A method comprising:
receiving periodic rumination and posture information from sensors attached to a bovine asset;
performing rumination aberration detection via a programmed computer to detect when the periodic bovine asset rumination duration diverges from a known bovine rumination pattern; and
performing motion aberration detection to detect when the periodic bovine asset motion diverges from a known bovine motion pattern.

21. The method of example 20 wherein the periodic information is received daily.

22. The method of any of examples 20-21 and further comprising:
receiving thermal images of a bovine vulva;
determining via a computer when a daily bovine thermal aberration diverges from a known bovine thermal pattern.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A bovine asset management system comprising:
a rumination sensor to detect a daily bovine asset rumination duration;
a motion sensor to detect a daily bovine asset motion;

a rumination aberration detection module to detect when the daily bovine asset rumination duration diverges from a known bovine rumination pattern; and
a motion aberration detection module to detect when the daily bovine asset motion diverges from a known bovine motion pattern.

2. The system of claim 1, wherein the rumination sensor is an accelerometer configured to detect jaw motion.

3. The system of claim 1, wherein the motion sensor is an accelerometer, and wherein the motion aberration detection module is configured to use dead reckoning to determine a daily motion pattern.

4. The system of claim 1, wherein the rumination aberration detection module is configured to identify when the daily bovine asset rumination duration falls below a minimum rumination value or exceeds a maximum rumination value.

5. The system of claim 4, wherein minimum rumination value is 450 minutes per day, and wherein the maximum rumination value is 500 minutes per day.

6. The system of claim 1, further comprising:
a posture sensor to detect a daily bovine posture; and
a posture aberration detection module to detect when the daily bovine posture diverges from a known bovine posture pattern.

7. The system of claim 6, wherein the posture sensor is a accelerometer configured to detect bovine posture by detecting gravitational acceleration.

8. The system of claim 6, wherein the posture sensor is a gyroscope configured to detect changes in bovine posture by detecting gyroscopic rotation.

9. The system of claim 1, further comprising:
a data storage module to record data; and
a wireless communication module to communicate stored data to a network.

10. A bovine asset management system comprising:
an RFID patch;
a thermal imaging sensor to capture thermal images of a bovine vulva;
a bovine thermal aberration detection module to detect when the daily bovine thermal aberration diverges from a known bovine thermal pattern.

11. The bovine asset management system of claim 10 wherein the RFID patch comprises:
a rumination sensor to detect a daily bovine asset rumination duration;
a motion sensor to detect a daily bovine asset motion and posture; and
a transceiver coupled to receive information from the rumination sensor and the motion sensor.

12. The bovine asset management system of claim 11, wherein the rumination sensor comprises an accelerometer to detect chewing by sensing jaw motion.

13. The bovine asset management system of claim 12 wherein the motion sensor comprises an accelerometer positioned to detect orientation of the bovine asset.

14. The bovine asset management system of claim 13 wherein the motion sensor further comprises a gyroscope positioned to detect rotation of the bovine asset.

15. A method comprising:
receiving periodic rumination and posture information from sensors attached to a bovine asset;
performing rumination aberration detection via a programmed computer to detect when the periodic bovine asset rumination duration diverges from a known bovine rumination pattern; and performing motion aberration detection to detect when the periodic bovine asset motion diverges from a known bovine motion pattern.

16. The method of claim 15 wherein the periodic information is received daily.

17. The method of claim 15 and further comprising:

receiving thermal images of a bovine vulva;

determining via a computer when a daily bovine thermal aberration diverges from a known bovine thermal pattern.

* * * * *